(12) United States Patent
Huang et al.

(10) Patent No.: US 6,463,238 B1
(45) Date of Patent: Oct. 8, 2002

(54) UPPER TRANSPARENCY COVER (75) Inventors: Yin-Chun Huang; Chih-Wen Huang, both of Hsinchu (TW)

(73) Assignee: Umax Data Systems, Inc. (TW)

( * ) Notice: Subject to any disclaimer, the term of this patent is extended or adjusted under 35 U.S.C. 154(b) by 0 days.

(21) Appl. No.: 09/978,136

(22) Filed: Oct. 15, 2001

(51) Int. Cl.[7] .......................... G03G 15/04; G03G 15/00
(52) U.S. Cl. ........................................ 399/221; 399/380
(58) Field of Search ................................ 358/497, 505, 358/509; 399/107, 118, 219, 220, 221, 379, 380

(56) References Cited

U.S. PATENT DOCUMENTS 4,277,166 A * 7/1981 van Boven et al. ......... 399/220
5,287,147 A * 2/1994 Fukasawa et al. .......... 399/220
5,450,173 A * 9/1995 Bekanich ................... 399/221

* cited by examiner

Primary Examiner—Hoang Ngo (57) ABSTRACT

The present invention is to provide a light source module for optical scanner, which may mainly receive the light source provided by at least one lamp. The light source module for optical scanner includes: at least one light-guiding element and a light-gathering element. The light-guiding element has a first surface and a second surface. The sectional area of the first surface is larger than that of the second surface. The first surface may receive the light of the lamp and transmit it to the second surface by the light-guiding element. The light-gathering element has a light-gathering front surface that is adjacent to the second surface. The light-gathering element is connected with the second surface. The second surface gathers the light transmitted by the light-guiding element and scatters the light uniformly by the light-gathering front surface.

11 Claims, 12 Drawing Sheets

UPPER TRANSPARENCY COVER

1. FIELD OF THE INVENTION

The present invention relates to a light source module for optical scanner, especially to a kind of light source module for optical scanner that may converge gathered light.

2. BACKGROUND OF THE INVENTION

Since hi-tech is progressed abruptly in recent years, especially the relative technologies of manufacture of microelectronic devices being improved continuously, so computer has already penetrated into every family and business and become an indispensable electronic product in daily lives. Following the prevalence of computer multi media, more peripheral products are needed for the inputting and outputting devices. Because of continuous innovation for the technology of optical-electronic semiconductor, the product technology for the peripheral devices of computer such as optical scanner is also made to become more mature and more popular. Currently, the optical scanner has become an indispensable product in the peripheral devices for computer.

Figure 1A:
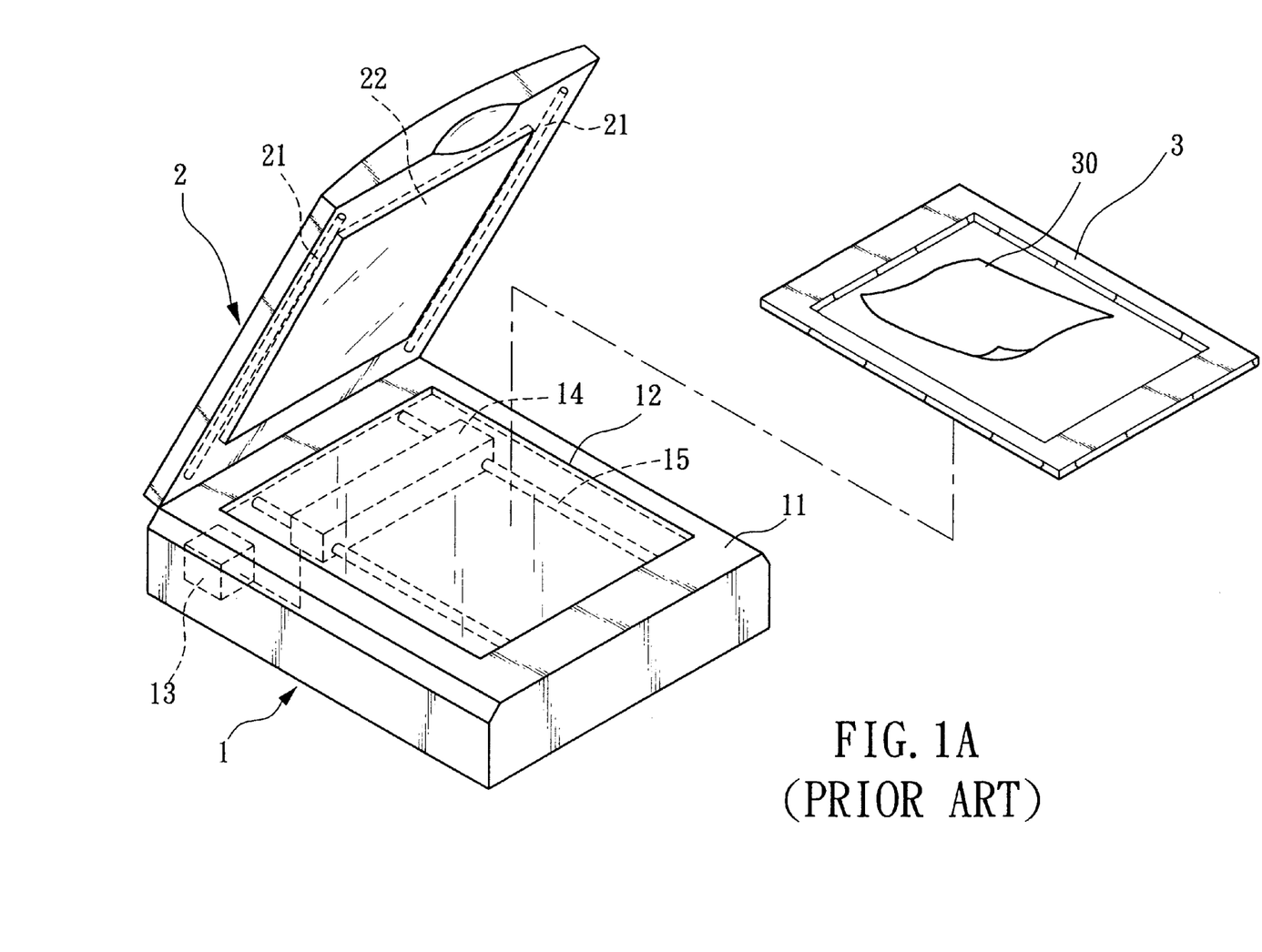
FIG. 1A is an implementing illustration of three-dimensional structure for the flatbed-typed scanner of prior arts having upper transparency cover.
Figure 1B:
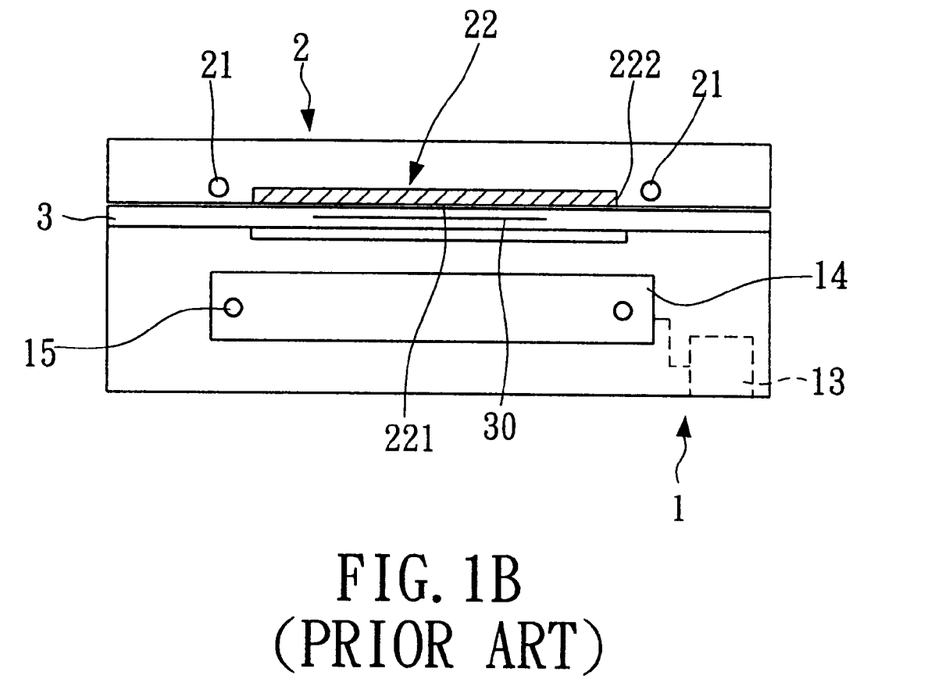
FIG. 1B is an implementing illustration of cross-sectional structure for the flatbed-typed scanner of prior arts having upper transparency cover.
Figure 1C:
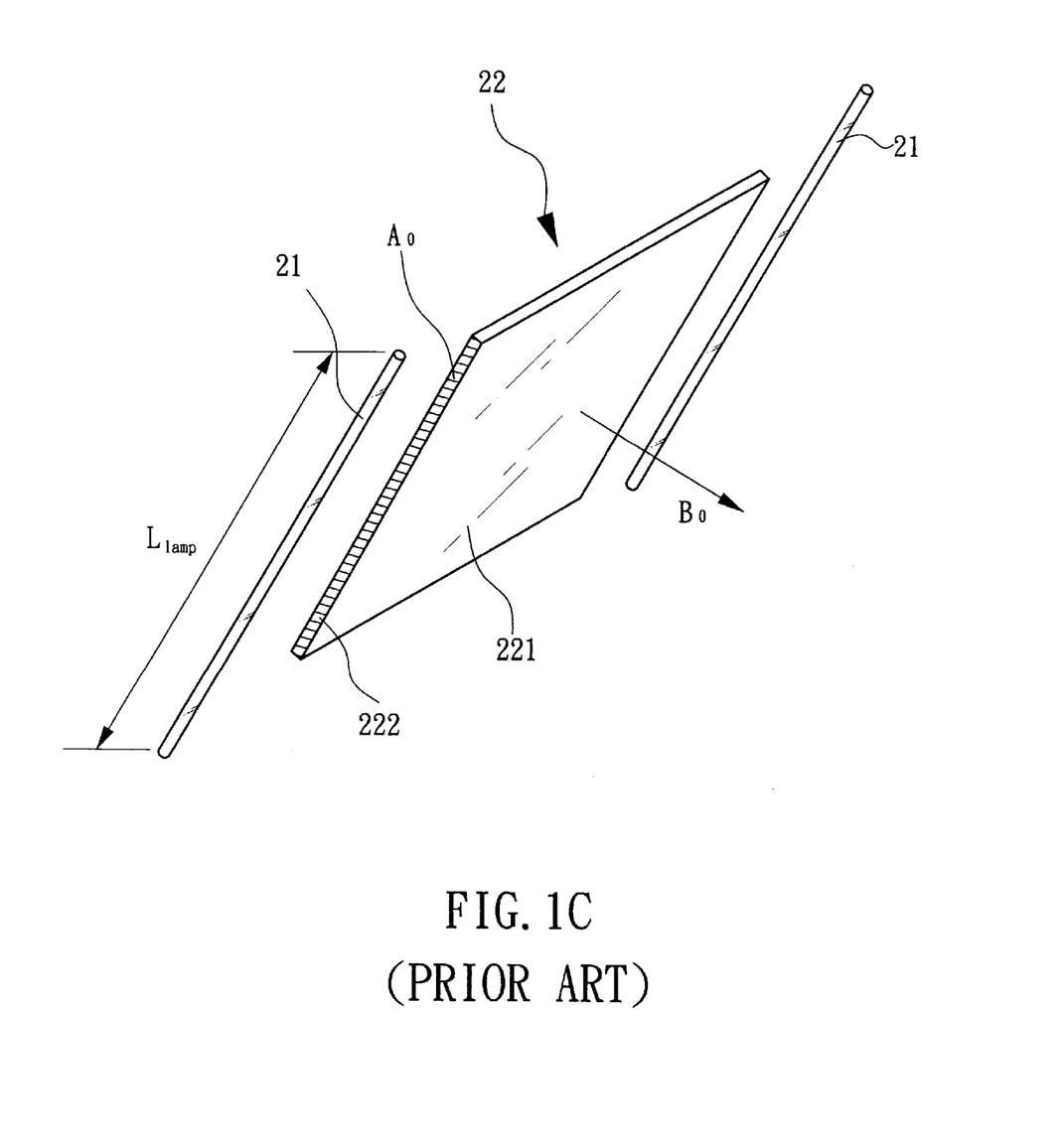
FIG. 1C is an implementing illustration of three-dimensional structure for the upper transparency cover in prior arts.
Figure 2A:
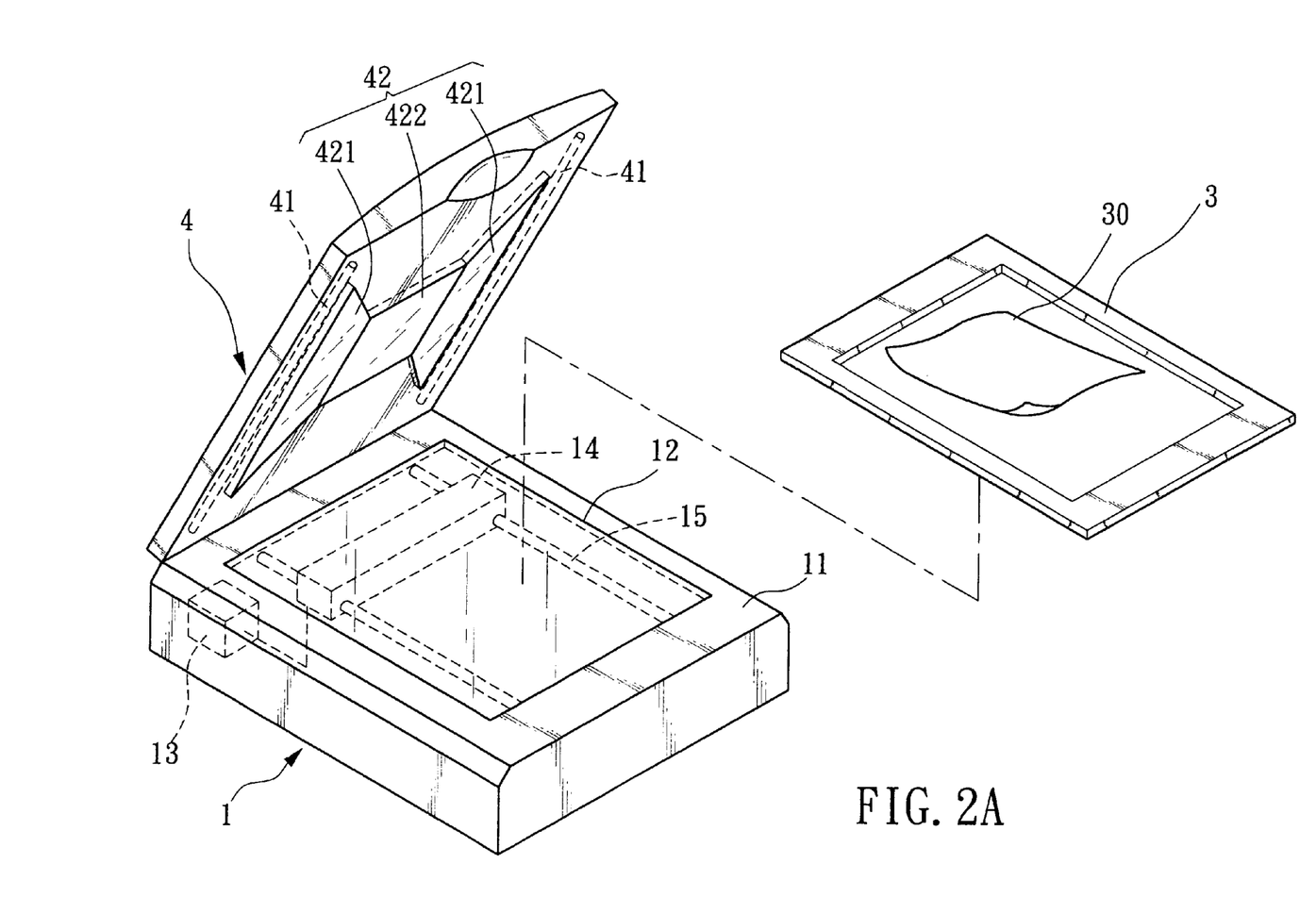
FIG. 2A is an implementing illustration of three-dimensional structure for the first preferred embodiment of the optical scanner of the present invention having upper transparency cover.
Figure 2B:
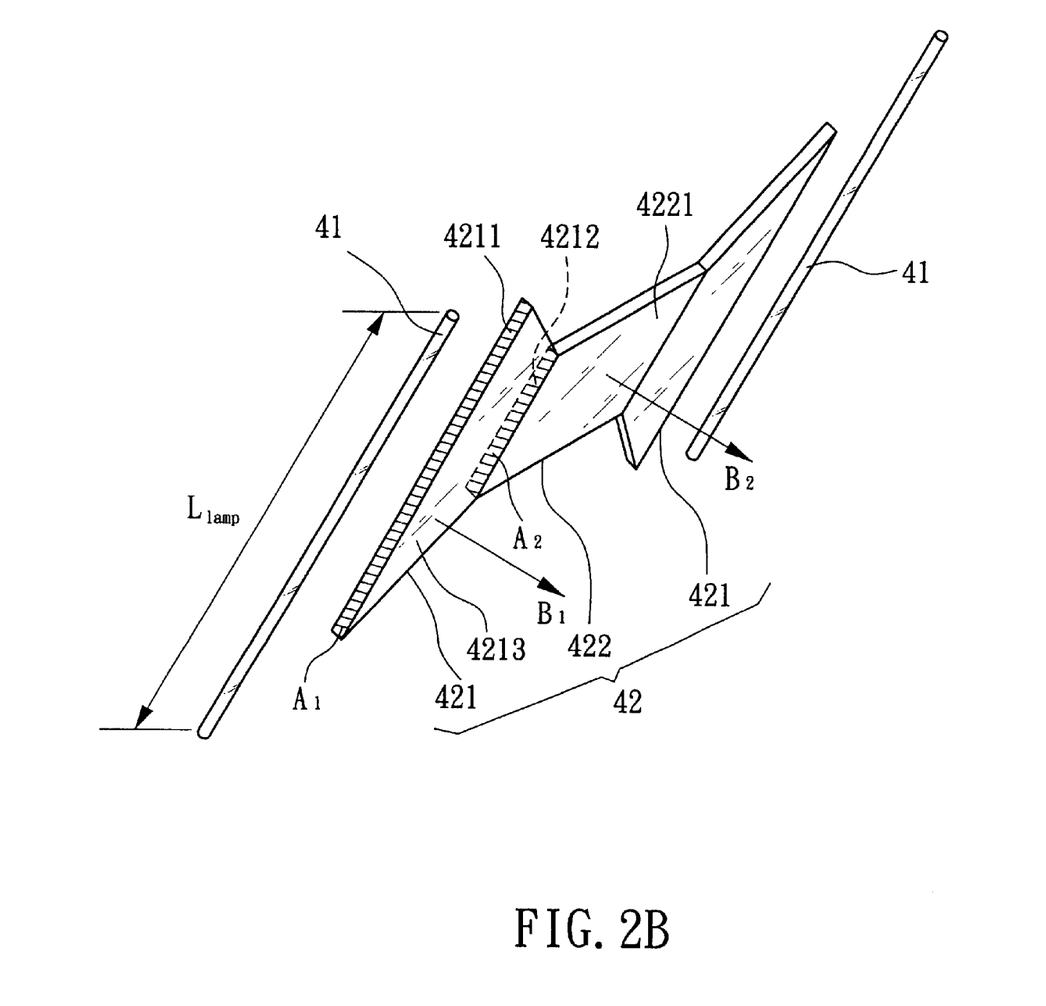
FIG. 2B is an implementing illustration of three-dimensional structure for the first preferred embodiment of the upper transparency cover of the present invention.
Figure 2C:
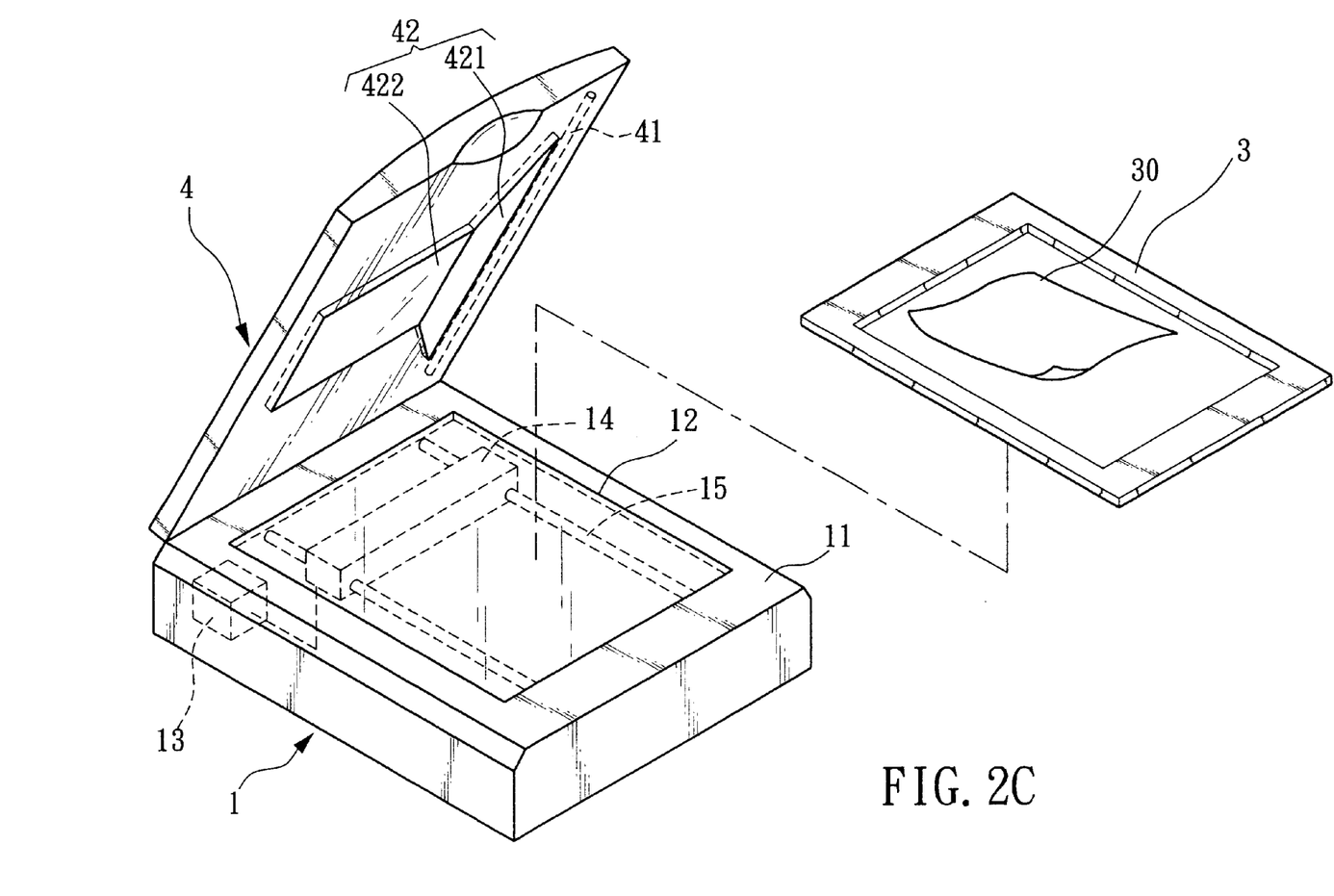
FIG. 2C is an implementing illustration of three-dimensional structure for the second preferred embodiment of the optical scanner of the present invention having upper transparency cover.
Figure 2D:
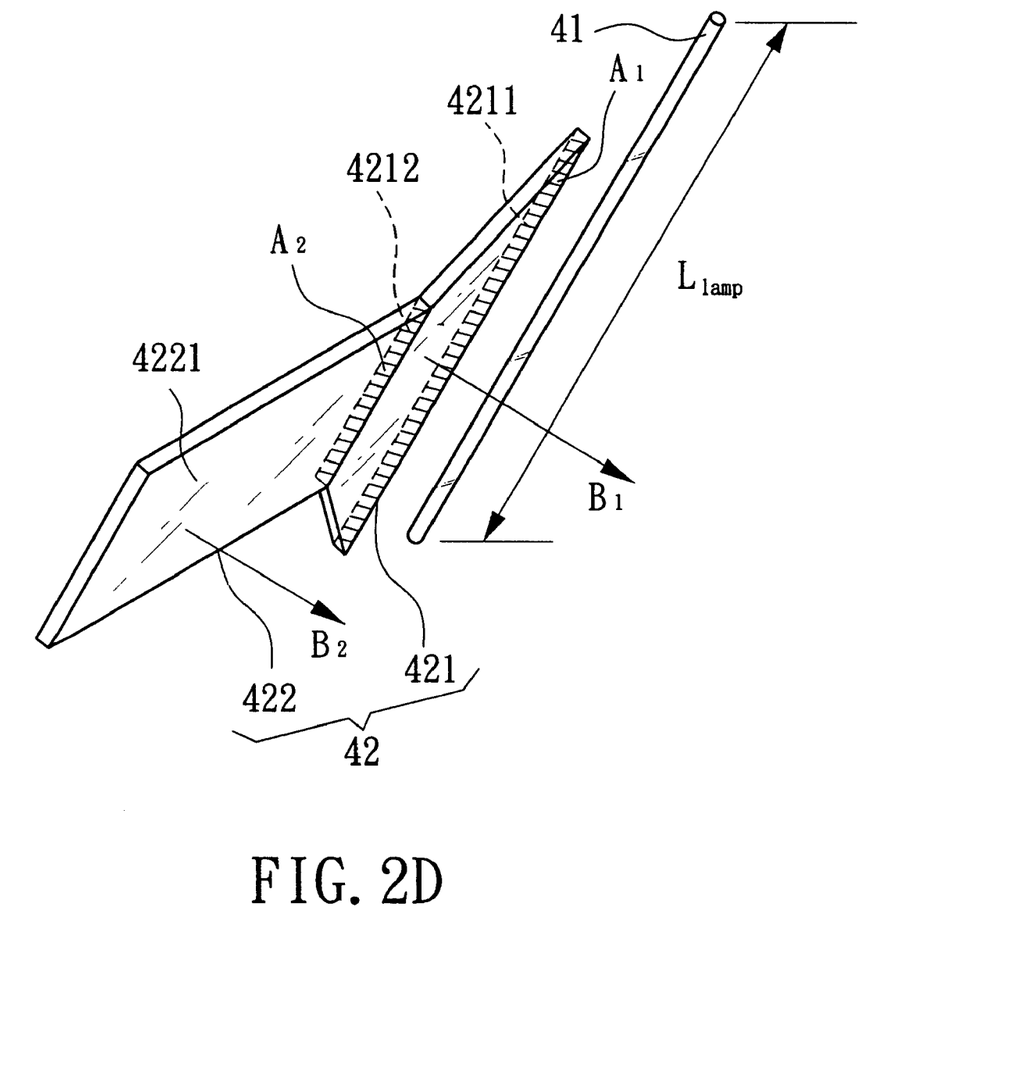
FIG. 2D is an implementing illustration of three-dimensional structure for the second preferred embodiment of the upper transparency cover of the present invention.
Figure 2E:
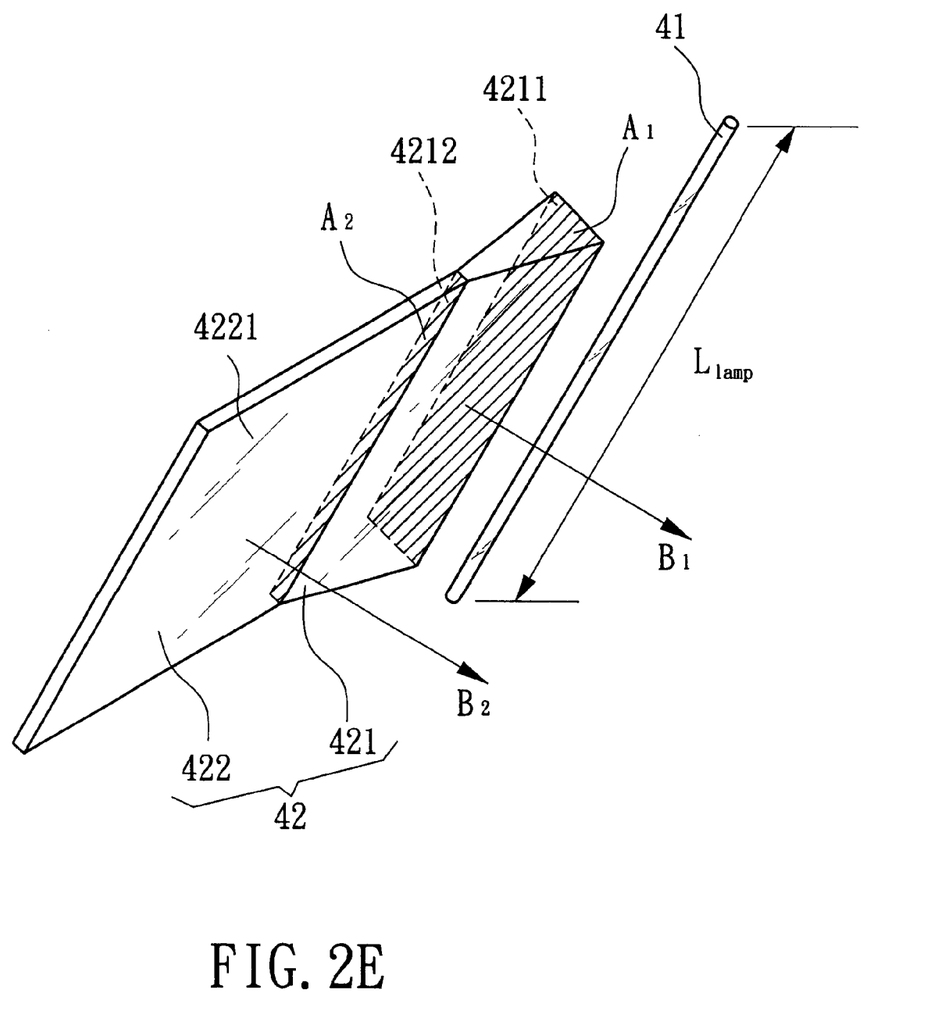
FIG. 2E is an implementing illustration of three-dimensional structure for the third preferred embodiment of the upper transparency cover of the present invention.
Figure 3A:
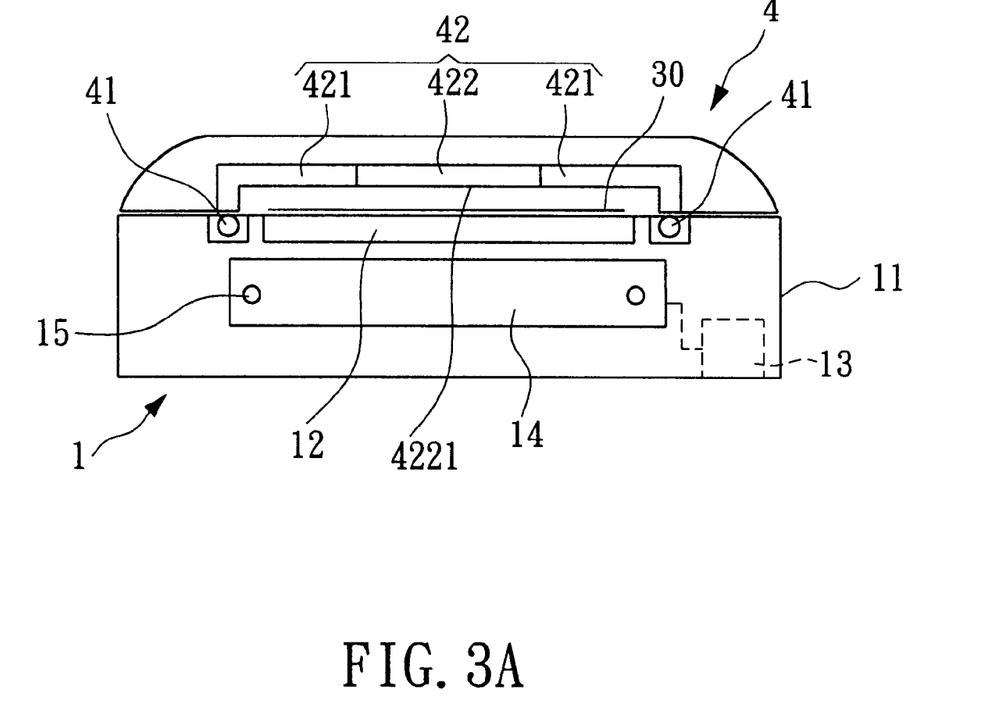
FIG. 3A is an implementing illustration of cross-sectional structure for the third preferred embodiment of the optical scanner of the present invention having upper transparency cover.
Figure 3B:
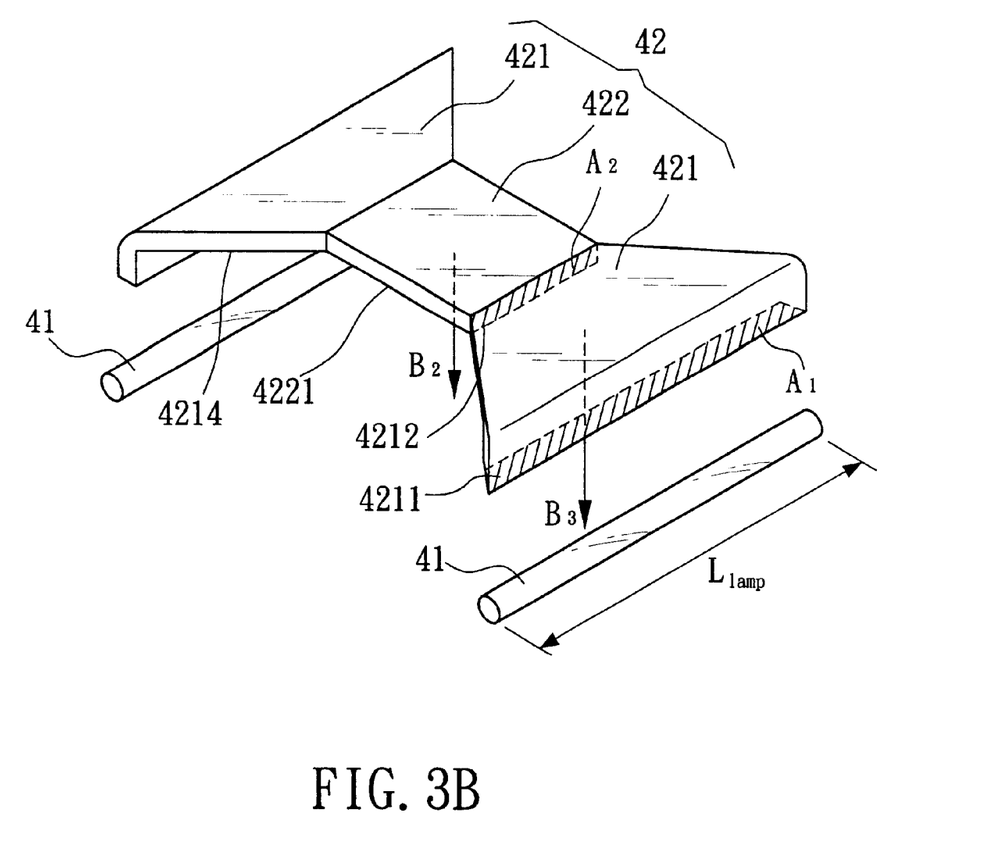
FIG. 3B is an implementing illustration of three-dimensional structure for the fourth preferred embodiment of the upper transparency cover of the present invention.
Figure 3C:
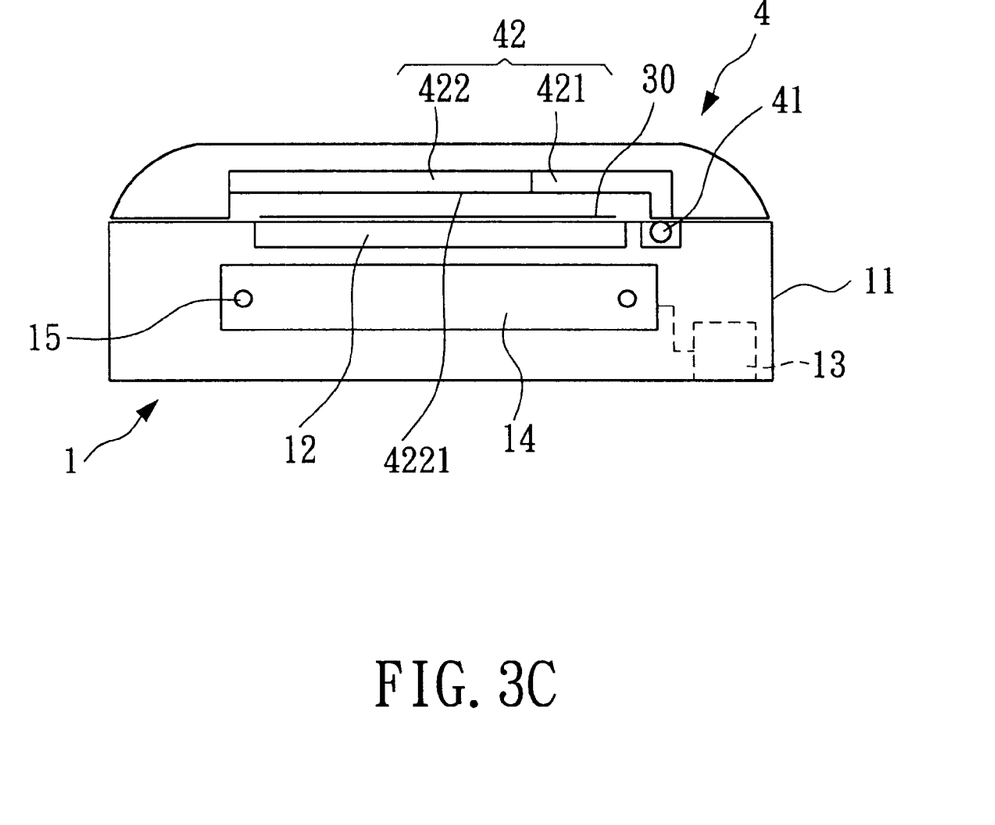
FIG. 3C is an implementing illustration of cross-sectional structure for the fourth preferred embodiment of the optical scanner of the present invention having upper transparency cover.
Figure 3D:
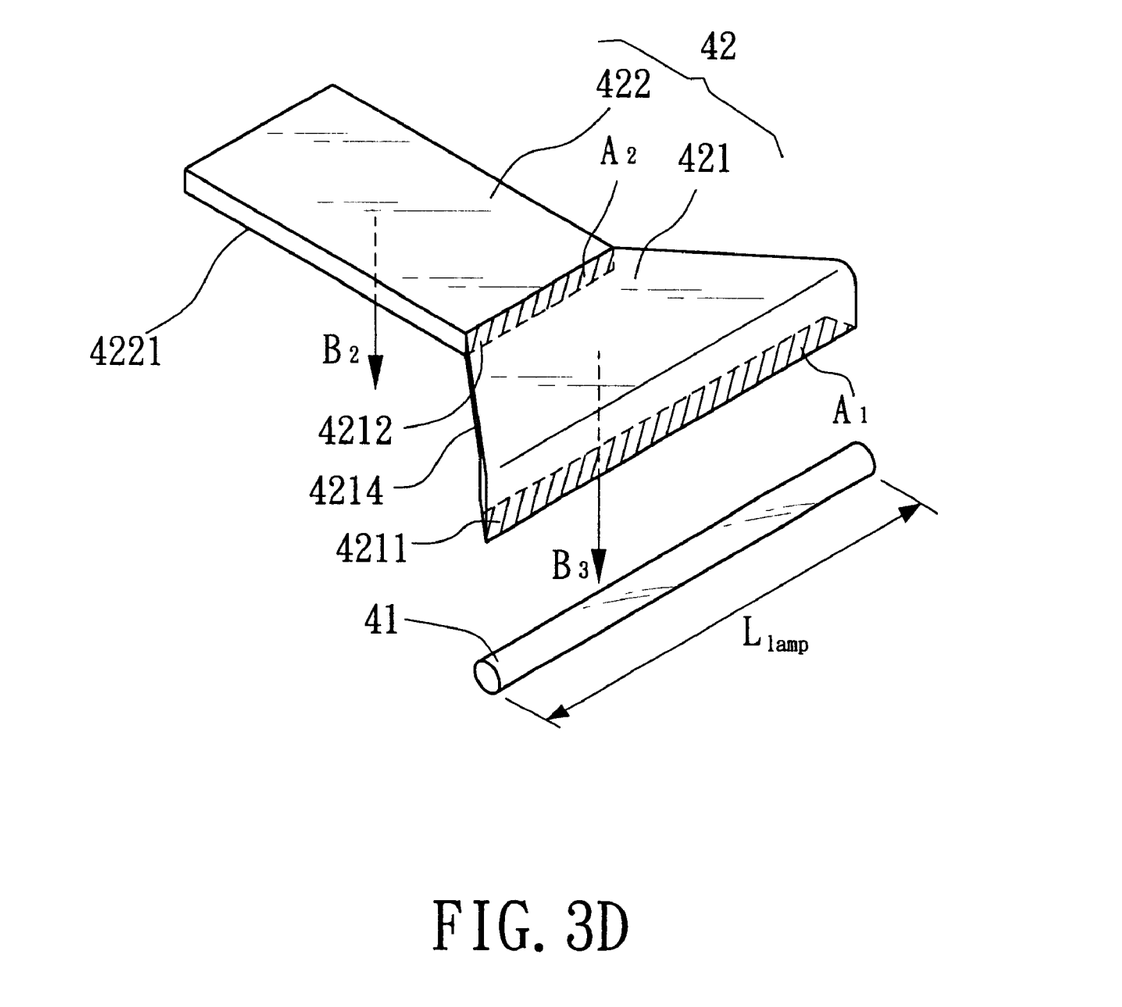
FIG. 3D is an implementing illustration of three-dimensional structure for the fifth preferred embodiment of the upper transparency cover of the present invention.

Please refer to FIG. 1A through FIG. 1C, which are structure illustrations for embodiments of typical flatbed optical scanner of prior arts having upper transparency cover commonly seen in current market. The main structure characteristic is that a document window glass 12 is provided on the upper surface of the outer shell 11 of an optical scanner 1 for placing a reflection-typed document (not shown). An optical chassis 14 driven by a driving device 13 proceeds a liner motion along the direction of a guiding rod 15 in the hollow outer shell 11 to execute image-scanning job on the reflection-typed document (not shown) placed on the document window glass 12.

When the optical scanner 1 executes a scanning on a transparent document 30, wherein an upper transparency cover device 2 is connected to the upper portion of the outer shell 11 of the optical scanner 1 by a manner of pivotal rotation. Of course, it may also like the description in U.S. Pat. No. 5,467,172 that the upper transparency cover device 2 may be separated from the outer shell 11. When executing a scanning, after the transparent document 30 is placed on the document window glass 12, the upper transparency cover device 2 is then placed thereon. In order to understand and simplify the description of this application, the drawings are described by a connection manner of pivotal rotation. That is, when executing a scanning on the transparent document 30, firstly the upper transparency cover device 2 must cover the outer shell 11 by the manner of pivotal rotation, and a scanning motion is then executed.

The upper transparency cover device 2 is provided at least one lamp 21 and a upper transparency cover 22. The upper transparency cover 22 has a reflective layer for reflecting light, a light-guiding layer for transmitting light, and a collimating layer for paralleling light. Therefore, after a side surface 222 of the upper transparency cover 22 receives the light source provided by the lamp 21, and by reflecting, transmitting, and paralleling the light, the light source is uniformly distributed and projected onto the transparent document 30 by a front surface 221 of the upper transparency cover 22 adjacent to the side surface 222 of the upper transparency cover 22. To prevent the light source projected by the front surface 221 of the upper transparency cover 22 from scattering outwardly, the document window glass 12 is further placed an auxiliary frame 3. The auxiliary frame 3 may close the transparent document 30 tightly to make the light source provided by the front surface 221 of the upper transparency cover 22 be able to be projected onto the transparent document 30 sufficiently without generating the phenomenon of scattering outwardly. Again, the optical chassis 14 driven by the driving device 13 proceeds linear reciprocation along the direction of the guiding rod 15 in the hollow outer shell 11 to execute an image-scanning job for the transparent document 30 placed on the document window glass 12.

Above description may be explained by the theory of optical energy. The light energy $E_{lamp}$ is proportional to the product of both lamp tube length $L_{lamp}$ and unit energy of lamp tube length $\epsilon_{lamp}$ (i.e., $E_{lamp}\ L_{lamp}*\epsilon_{lamp}$) The unit energy of lamp tube length $\epsilon_{lamp}$ again has specific relationship with the current value and sorts of the filled gas in the lamp tube. And, the light energy $E_{lamp}$ provided by the lamp 21 is also proportional to the product of both the sectional area Ao of the side surface 222 of the upper transparency cover 22 and the brilliance value Bo of the front surface 221 of the upper transparency cover 22 (i.e., $E_{lamp}$ Ao*Bo). Therefore, after the side surface 222 of the upper transparency cover 22 absorbs the light energy $E_{lamp}$ provided by the lamp 21, the front surface 221 of the upper transparency cover 22 provides uniform light source to execute scanning job for the transparent document 90. But, since the sectional area Ao of the side surface 222 of the upper transparency cover 22 is fixed, so the brilliance value Bo of the front surface 221 of the upper transparency cover 22 is also a fixed value. Therefore, the optical chassis 14 is unable to pick the image of the transparent document 30 clearly. And, the scanned image is less clear and its effect is poor. If the lamp tube length $L_{lamp}$ is increased, then the volume of the upper transparency cover module 2 will also be enlarged. If improving the unit energy of the lamp tube length $\epsilon_{lamp}$, then the manufacturing cost will be raised relatively. Therefore, in the mean time to request electronic products possessing factors of shortness, smallness, lightness, and thinness, etc., how to execute an optimal result of scanning is a problem that is urgently waited to be solved and improved by the manufacturing industry and the relative business of scanner manufacturers.

SUMMARY OF THE INVENTION

The main object of the present invention is to provide a light source module for optical scanner, which may provide the function of converging gathered light to further focus the energy of lamp to execute scanning job on the transparent document.

The secondary object of the present invention is to provide a light source module for optical scanner, of which the light-guiding element and the light-gathering element are formed integrally to transfer the light source provided by the lamp surely.

A further object of the present invention is to provide a light source module for optical scanner, of which the light-guiding element and light-gathering element are formed integrally to fulfill the functions of parts reduction and convenient manufacture.

To fulfill the above-mentioned objects, a light source module for optical scanner of the present invention may receive the light source provided by at least one lamp. The upper transparency cover includes: at least one light-guiding element and a light-gathering element.

The light-guiding element has a first surface and a second surface. The sectional area of the first surface is larger than that of the second surface. The first surface may receive the light of the lamp and transmit it to the second surface by the light-guiding element.

The light-gathering element has a light-gathering front surface that is adjacent to the second surface. The light-gathering element is connected with the second surface. The second surface gathers the light transmitted by the light-guiding element and scatters the light uniformly by the light-gathering front surface.

For your esteemed reviewing committee to further understand and recognize the present invention, a detailed description in cooperation with corresponding drawings are presented as following.

DETAILED DESCRIPTION OF THE PREFERRED EMBODIMENT

The main characteristic of the present invention is that the upper transparency cover is formed integrally. The upper transparency cover applies the change of the sectional area to reach the provision of convergence and concentration of energy on the scanned zone.

Please refer to FIG. 2A through FIG. 2E, which are implementing illustrations of three-dimensional structure of the preferred embodiments for the optical scanner and its upper transparency cover device of the present invention having upper transparency cover. Wherein, an optical scanner 1 executes image scanning job on a reflective document (not shown) placed on a document window glass 12 provided on the upper side surface of the outer shell 11 of the optical scanner 1. An optical chassis 14 driven by a driving device 13 proceeds linear motion along the direction of the guiding rod 15 in the hollow outer shell 11 to execute image-scanning job on a reflective document (not shown) placed on the document window glass 12. When the optical scanner 1 executes a scanning on a transparent document 30, wherein an upper transparency cover device 4 is connected to the upper portion of the outer shell 11 of the optical scanner 1 by a manner of pivotal rotation. Of course, it may also like the description in U.S. Pat. No. 5,467,172 that the upper transparency cover device 4 may be separated from the outer shell 11. When executing a scanning job, after the transparent document 30 is placed on the document window glass 12, the upper transparency cover device 4 is then placed thereon. In order to understand and simplify the description of this application, the drawings are described by a connection manner of pivotal rotation. That is, when executing a scanning on the transparent document 30, firstly the upper transparency cover device 4 must cover the outer shell 11 by the manner of pivotal rotation, and a scanning motion is then executed.

The upper transparency cover device 4 is provided with at least one lamp 41 and an upper transparency cover 42. The upper transparency cover 42 may receive the light provided by the lamp 41. The upper transparency cover 42 includes: at least one light-guiding element 421 and a light-gathering element 422. In the prior arts, the light-guiding element 421 and the light-gathering element 422 all have the reflection layer for reflecting light, the light-guiding layer for transmitting light, and the collimating layer for paralleling light. So, through being reflected, transmitted, and paralleled, the light is uniformly scattered in the light-gathering element 422. In the preferred embodiments of the present invention, the upper transparency cover 42 is made of polymer that is projected out and formed into one body. Such kind of formation of one body is well known to those who are skilled in the arts, so repetitious description is not presented herein any more.

The light-guiding element 421 has a first surface 4211 and a second surface 4212. In the preferred embodiment of the invention, wherein the sectional area $A_1$ of the first surface 4211 and the sectional area $A_2$ of the second surface 4212 are all shapes of rectangular. The first surface 4211 and the second surface 4212 are two planes that are parallel to each other. And, the sectional area $A_1$ of the first surface 4211 is larger than the sectional area $A_2$ of the second surface 4212 (i.e., $A_1>A_2$). Therefore, the light-guiding element 421 is made to be formed as a piece structure of trapezoid by connecting the first surface 4211 and the second surface 4212 with straight lines. Of course, the connection between the first surface 4211 and the second surface 4212 can be made by curved lines or other arc lines. And, the connection for the sectional area that $A_1$ is larger than $A_2$ can also be the change of thickness. Such kinds of variation of structures are well known to those who are skilled in the arts and may be modified and implemented of above disclosure without losing the merit of the present invention and departing from the spirit and scope of the present invention, so more detailed description is not repetitiously presented herein. The piece structure of trapezoid is connected to the first surface 4211 and the second surface 4212 by abutting against a front surface of trapezoid 4213 of the document window glass 12. The structure of the front surface of trapezoid 4213 is formed by being perpendicular to both the first surface 4211 and the second surface 4212. Therefore, from the theoretical analysis of optical energy, when the first surface 4212 receives the light provided by the lamp 41, and when the light is reflected, transmitted, and paralleled to the second surface 4212 by the light-guiding element 421 of piece structure of trapezoid, the light energy $E_{lamp}$ provided by the lamp 41 has a proportional relationship with the product of both sectional area $A_1$ of the first surface 4211 and the brilliance value $B_1$ of the front surface of trapezoid 4213 (i.e., $E_{lamp} A_1*B_1$). The light-gathering element 422 is a piece structure of rectangular and is connected with the second surface 4212 by forming integrally. The light-gathering element 422 also has a light-gathering front surface of 4221 that is adjacent to the second surface 4212. The structure of the light-gathering front surface of 4221 is an extension of the front surface of trapezoid 4213 and is vertical to the second surface 4212. Therefore, when the light transmitted by light-guiding element 422 is gathered by the second surface 4212, the light energy $E_{lamp}$ provided by the lamp 41 has the proportional relationship with the product of both sectional area $A_2$ of the second surface 4212 and the brilliance value $B_2$ of the light-gathering front surface 4221 (i.e., $E_{lamp} A_2*B_2$). Thereby, when the sectional area $A_1$ of the first surface 4211 is larger than the sectional area $A_2$ of the second surface 4212 (i.e., $A_1>A_2$), it will created that the brilliance value $B_2$ of the light-gathering front surface 4221 is larger than the brilliance value $B_1$ of the front surface of trapezoid (i.e., $B_2>B_1$). Therefore, the light transmitted by the light-guiding element 421 may be scattered uniformly by the light-gathering front surface 4221 and has higher brilliance value $B_2$ to execute light projection on the transparent document 30. To prevent the light projected by the light-gathering front surface 4221 of the upper transparency cover 42 from scattering outwardly, an auxiliary frame 3 is further placed on the document window glass 12. The auxiliary frame 3 may close the transparent document 30 tightly to make the projected light provided by the light-gathering front surface 4221 be able to be projected on transparent document 30 sufficiently without being scattered outwardly. Again, the optical chassis 14 driven by the driving device 13 proceeds a linear motion along the direction of the guiding rod 15 in the hollow outer shell 11 to execute image-scanning job on the transparent document 30 placed on the document window glass 12.

In the preferred embodiments of the invention, the number of the lamp 41 may be one or two. And, the number of the light-guiding element 421 corresponding to the lamp 41 may also be one or two. For the light-gathering element 422, the designs of the lamp 41 and the light-guiding element 421 may be left-and-right symmetrical structures that may enhance the brilliance $B_2$ of the light-gathering front surface 4221. And, when the design number is one, it won't influence its function. Such kinds of variation of structures are well known to those who are skilled in the arts and may be modified and implemented of above disclosure without losing the merit of the present invention and departing from the spirit and scope of the present invention, so more detailed description is not repetitiously presented herein.

Please refer to FIG. 3A through FIG. 3D, which are implementing illustrations of three-dimensional structure for another preferred embodiment of the optical scanner and its upper transparency cover of the present invention having upper transparency cover. Wherein, in the preferred embodiment of the invention, in order to reduce the weight of the upper transparency cover device 4 and simplify its structure, the lamp 41 is provided in the optical scanner. Thereby, it may avoid the inconvenience generated by installing a power line for the lamp 41 in the upper transparency cover device 4. And, the upper transparency cover device 4 is provided with an upper transparency cover 42, which includes: at least one light-guiding element 421 and a light-gathering element 422. The light-gathering element 422 may be placed and abutted on appropriate position in the document window glass 12. The light-guiding element 421 has a first surface 4211 and a second surface 4212. In the preferred embodiment of the invention, wherein the sectional area $A_1$ of the first surface 4211 and the sectional area $A_2$ of the second surface 4212 are all shapes of rectangular. And, the sectional area $A_1$ of the first surface 4211 is larger than the sectional area $A_2$ of the second surface 4212 (i.e., $A_1>A_2$). In order to make the first surface 4211 be corresponding to the lamp 41 for the convenience to receive the light of the lamp 41, therefore the light-guiding element 421 is formed into a piece structure of trapezoid of appropriate curvature and is connected to both the first surface 4211 and the second surface 4212 by abutting against a front surface of curved trapezoid 4214 of the document window glass 12. In the preferred embodiment of the invention, the first surface 4211 and the second surface 4212 are two planes that are first extended and then vertical to each other. Of course, they may also be two planes that are extended first and then formed into an appropriate angle. Such kinds of variation of structures are well known to those who are skilled in the arts and may be modified and implemented of above disclosure without losing the merit of the present invention and departing from the spirit and scope of the present invention, so more detailed description is not repetitiously presented herein.

From the theoretical analysis of optical energy, when the first surface 4211 receives the light of the lamp 41, and when the light is transmitted to the second surface 4212 by the light-guiding element 421 of the piece structure of curved trapezoid, the light energy $E_{lamp}$ provided by the lamp 41 has a proportional relationship with the product of both sectional area $A_1$ of the first surface 4211 and the brilliance value $B_3$ of the front surface of curved trapezoid 4214 (i.e., $E_{lamp} A_1*B_3$). The light-gathering element 422 is a piece structure of rectangular and is connected with the second surface 4212 by forming integrally. The light-gathering element 422 also has a light-gathering front surface 4221 that is adjacent to the second surface 4212. The light-gathering front surface 4221 is a structure that is vertical to the second surface 4212. Therefore, when the light transmitted by light-guiding element 422 is gathered by the second surface 4212, the light energy $E_{lamp}$ provided by the lamp 41 has the proportional relationship with the product of both sectional area $A_2$ of the second surface 4212 and the brilliance value $B_2$ of the light-gathering front surface 4221 (i.e., $E_{lamp} A_2*B_2$). Thereby, when the sectional area $A_1$ of the first surface 4211 is larger than the sectional area $A_2$ of the second surface 4212 (i.e., $A_1>A_2$), it will created that the brilliance value $B_2$ of the light-gathering front surface 4221 is larger than the brilliance value $B_3$ of the front surface of curved trapezoid (i.e., $B_2>B_3$). Therefore, the light transmitted by the light-guiding element 421 may be scattered uniformly by the light-gathering front surface 4221 and has higher brilliance value $B_2$ to execute light projection on the transparent document 30. Again, the optical chassis 14 driven by the driving device 13 proceeds a linear motion along the direction of the guiding rod 15 in the hollow outer shell 11 to execute image-scanning job on the transparent document 30 placed on the document window glass 12.

In the preferred embodiments of the invention, the number of the lamp 41 may be one or two. And, the number of the light-guiding element 421 corresponding to the lamp 41 may also be one or two. For the light-gathering element 422, the designs of the lamp 41 and the light-guiding element 421 may be left-and-right symmetrical structures that may enhance the brilliance $B_2$ of the light-gathering front surface 4221. And, when the design number is one, it won't influence its function. Such kinds of variation of structures are well known to those who are skilled in the arts and may be modified and implemented of above disclosure without losing the merit of the present invention and departing from the spirit and scope of the present invention, so more detailed description is not repetitiously presented herein.

What is claimed is:

1. A light source module for optical scanner, capable of receiving a light source provided by at least one lamp, comprising:

at least one light-guiding element, having a first surface and a second surface, and a sectional area of the first surface is larger than that of the second surface, and the first surface capable of receiving the light and transmit it to the second surface by the light-guiding element; and a light-gathering element, having a light-gathering front surface that is adjacent to the second surface, and the light-gathering element is connected with the second surface that gathers the light transmitted by the light-guiding element and scatters the light uniformly by the light-gathering front surface.

2. The light source module for optical scanner of claim 1, wherein the sectional area of the first surface is a shape of rectangular.

3. The light source module for optical scanner of claim 1, wherein the sectional area of the second surface is a shape of rectangular.

4. The light source module for optical scanner of claim 1, wherein the light-guiding element and the light-gathering element are projected out and formed integrally.

5. The light source module for optical scanner of claim 1, wherein the light-guiding element and the light-gathering element are polymer materials formed integrally.

6. The light source module for optical scanner of claim 1, wherein the light-gathering element is a piece shape of rectangular.

7. The light source module for optical scanner of claim 1, wherein the light-guiding element is a piece shape of trapezoid.

8. The light source module for optical scanner of claim 1, wherein the number of light-guiding element corresponds to that of the lamp.

9. The light source module for optical scanner of claim 1, wherein the light-gathering element may be placed and abutted on an appropriate position of a document window glass.

10. The light source module for optical scanner of claim 9, wherein the lamp is provided in a scanner.

11. The light source module for optical scanner of claim 10, wherein the light-guiding element is formed as a piece shape of trapezoid with appropriate curvature to make the first surface and the lamp corresponding to each other.

* * * * *